(12) United States Patent
Liu et al.

(10) Patent No.: US 10,320,791 B2
(45) Date of Patent: Jun. 11, 2019

(54) METHOD AND APPARATUS FOR FACILITATING ACCESS TO A COMMUNICATION NETWORK

(71) Applicants: Jennifer Liu, Plano, TX (US); Bruno Landais, Pleumeur-Bodou (FR); Laurent Thiebaut, Antony (FR)

(72) Inventors: Jennifer Liu, Plano, TX (US); Bruno Landais, Pleumeur-Bodou (FR); Laurent Thiebaut, Antony (FR)

(73) Assignees: Nokia of America Corporation, Murray Hill, NJ (US); Alcatel Lucent, Nozay (FR)

( * ) Notice: Subject to any disclaimer, the term of this patent is extended or adjusted under 35 U.S.C. 154(b) by 0 days.

(21) Appl. No.: 14/983,090

(22) Filed: Dec. 29, 2015

(65) Prior Publication Data

US 2017/0187715 A1 Jun. 29, 2017

(51) Int. Cl.
| | | |
|---|---|---|
| *H04W 8/06* | (2009.01) | |
| *H04L 29/06* | (2006.01) | |
| *H04W 12/08* | (2009.01) | |
| *H04W 12/06* | (2009.01) | |
| *H04W 84/12* | (2009.01) | |
| *H04W 84/04* | (2009.01) | |

(52) U.S. Cl.
CPC .......... *H04L 63/10* (2013.01); *H04L 63/0892* (2013.01); *H04W 12/06* (2013.01); *H04W 12/08* (2013.01); *H04W 8/06* (2013.01); *H04W 84/042* (2013.01); *H04W 84/12* (2013.01)

(58) Field of Classification Search
USPC .......................................................... 726/4
See application file for complete search history.

(56) References Cited

U.S. PATENT DOCUMENTS

| | | | |
|---|---|---|---|
| 9,179,436 B1* | 11/2015 | Dhammawat | H04W 4/029 |
| 2008/0137861 A1* | 6/2008 | Lindmo | G06F 21/31 |
| | | | 380/270 |
| 2008/0219218 A1* | 9/2008 | Rydnell | H04W 92/02 |
| | | | 370/331 |
| 2010/0095011 A1* | 4/2010 | Sarikaya | G06F 15/16 |
| | | | 709/229 |
| 2011/0269457 A1* | 11/2011 | Liu | H04W 8/06 |
| | | | 455/433 |
| 2014/0134996 A1* | 5/2014 | Barclay | H04W 24/08 |
| | | | 455/422.1 |
| 2014/0146806 A1* | 5/2014 | Liu | H04W 8/04 |
| | | | 370/338 |
| 2014/0211626 A1* | 7/2014 | Liu | H04W 28/08 |
| | | | 370/235 |
| 2014/0269551 A1* | 9/2014 | Henderickx | H04W 8/082 |
| | | | 370/329 |
| 2016/0088676 A1* | 3/2016 | Zhao | H04L 63/0876 |
| | | | 370/328 |
| 2017/0063780 A1* | 3/2017 | Su | H04L 61/2015 |
| 2017/0156086 A1* | 6/2017 | Tomici | H04W 36/14 |

* cited by examiner

*Primary Examiner* — Taghi T Arani
*Assistant Examiner* — Badri Narayanan Champakesan
(74) *Attorney, Agent, or Firm* — Nokia of America Corporation

(57) ABSTRACT

A method and apparatus for facilitating WLAN access, both trusted and un-trusted, to a mobile core network. A device identity attribute is created and incorporated into the authentication and response messaging to enable the device identity to be promulgated in the communication network.

8 Claims, 8 Drawing Sheets

FIG. 5

| IDENTITY TYPE |
|---|
| IDENTITY LENGTH |
| IDENTITY VALUE |

FIG. 6

```
IDENTITY TYPE (OCTET 3)
BITS
7  6  5  4  3  2  1  0
0  0  0  0  0  0  0  0    RESERVED
0  0  0  0  0  0  0  1    IMEI
0  0  0  0  0  0  1  0    IMEISV
0  0  0  0  0  0  1  1    MEID
0  0  0  0  0  1  0  0    SN
0  0  0  0  0  1  0  1    MAC
0  0  0  0  0  1  1  0    UDI
0  0  0  0  0  1  1  1    ODIN
0  0  0  0  1  0  0  0    BLUETOOTH
```

FIG. 7

| 7 | 6 | 5 | 4 | 3 | 2 | 1 | 0 | OCTETS |
|---|---|---|---|---|---|---|---|---|
| R | ATTRIBUTE TYPE | | | | | | | 1 |
| ATTRIBUTE TYPE | | | | | | | | 2 |
| LENGTH | | | | | | | | 3, 4 |
| IDENTITY TYPE | | | | | | | | 5 |
| IDENTITY VALUE | | | | | | | | 6-n |

FIG. 8

BIT 7 OF OCTET 1 IS THE R BIT DEFINED IN IETF RFC 5996 [28]. THE R BIT IS THE RESERVED BIT SET TO ZERO.

BITS 0 THROUGH 6 OF OCTET 1 AND OCTET 2 IS THE ATTRIBUTE TYPE FIELD. THE ATTRIBUTE TYPE FIELD IS SET TO VALUE XXX TO INDICATE THE DEVICE_IDENTITY.

OCTET 3 AND OCTET 4 IS THE LENGTH FIELD. THIS FIELD INDICATES THE COMBINED LENGTH IN OCTETS OF THE IDENTITY TYPE AND IDENTITY VALUE FIELDS.

OCTET 5 IS THE IDENTITY TYPE FIELD. THIS FIELD INDICATES THE TYPE OF THE DEVICE IDENTITY.

```
IDENTITY TYPE (OCTET 3)
BITS
7 6 5 4 3 2 1 0
0 0 0 0 0 0 0 0    RESERVED
0 0 0 0 0 0 0 1    IMEI
0 0 0 0 0 0 1 0    IMEISV
0 0 0 0 0 0 1 1    MEID
0 0 0 0 0 1 0 0    SERIAL NUMBER
0 0 0 0 0 1 0 1    MAC ADDRESS
0 0 0 0 0 1 1 0    UDI
0 0 0 0 0 1 1 1    ODIN
0 0 0 0 1 0 0 0    BLUETOOTH ADDRESS

ALL OTHER VALUES ARE RESERVED.
```

OCTET 6-N IS THE IDENTITY VALUE FIELD INDICATING THE VALUE OF THE DEVICE IDENTITY.

FIG. 10

OCTET 1 INDICATES THE TYPE OF ATTRIBUTE AS AT_DEVICE_IDENTITY WITH A VALUE OF XXX. THIS ATTRIBUTE IS SKIPPABLE.

OCTET 2 IS THE LENGTH OF THIS ATTRIBUTE IN MULTIPLES OF 4 OCTETS AS SPECIFIED IN RFC 4187 [33].

OCTET 3 INDICATES THE TYPE OF DEVICE IDENTITY.

```
IDENTITY TYPE (OCTET 3)
BITS
7 6 5 4 3 2 1 0
0 0 0 0 0 0 0 0     RESERVED
0 0 0 0 0 0 0 1     IMEI
0 0 0 0 0 0 1 0     IMEISV
0 0 0 0 0 0 1 1     MEID
0 0 0 0 0 1 0 0     SERIAL NUMBER
0 0 0 0 0 1 0 1     MAC ADDRESS
0 0 0 0 0 1 1 0     UDI
0 0 0 0 0 1 1 1     ODIN
0 0 0 0 1 0 0 0     BLUETOOTH ADDRESS

ALL OTHER VALUES ARE RESERVED.
```

OCTET 4 IS IDENTITY LENGTH FIELD AND CONTAINS THE LENGTH OF THE IDENTITY VALUE IN OCTETS.

THE IDENTITY VALUE FIELD STARTS AT OCTET 5 AND ITS LENGTH IS INDICATED BY THE IDENTITY LENGTH FIELD. THE IDENTITY VALUE FIELD REPRESENTS THE DEVICE IDENTITY DIGITS OF THE CORRESPONDING IDENTITY TYPE, AND THE DIGITS ARE CODED USING BCD CODING.

THE OPTIONAL PADDING FIELD STARTS AFTER THE LAST OCTET OF THE IDENTITY VALUE FIELD. EACH OCTET OF THIS FIELD IS SET TO ZERO BY SENDING ENTITY AND IGNORED BY RECEIVING ENTITY.

METHOD AND APPARATUS FOR FACILITATING ACCESS TO A COMMUNICATION NETWORK

BACKGROUND

Field of the Disclosure

The present disclosure relates generally to network communication and, more particularly, to signaling identity for facilitating trusted and un-trusted WLAN access.

Description of the Related Art

The following abbreviations are herewith expanded, at least some of which are referred to within the following description.

3GPP 3$^{rd}$ Generation Partnership Project
AAA Authentication Authorization Accounting
AKA Authentication and Key Agreement
CDR Charging Data Record
EAP Extensible Authentication Protocol
EPC Evolved Packet Core
ePDG evolved Packet Data Gateway
HLR Home Location Register
HSS Home Subscriber Server
IEEE Institute of Electrical and Electronics Engineers
IETF Internet Engineering Task Force
IKE Internet Key Exchange
IMEI International Mobile Equipment Identity (3GPP)
IMEISV IMEI and Software Version
IMSI International Mobile Subscriber Identity
ITU International Telecommunication Union
MAC Media Access Control
MEID Mobile Equipment Identifier
OAM Operation, Administration and Maintenance
ODIN Open Device Identification Number
PDN Packet Data Network
PGW PDN Gateway
TWAN Trusted WLAN Access Network
WLAN Wireless Local Area Network Wireless communication networks have become both common and widespread in recent decades. Originally, telephone networks had not only on a core of switches for connecting call to many different locations, but individual telephone and similar instruments were connected to the network by wire or cable from largely fixed locations. The use of portable radios that were first called car phones and then cell phones could be carried around with a user and connect with the communication core network from any location within a covered area. Coverage has since expanded so that telephone service is available in a great many inhabited areas of the world.

UE (user equipment) other than telephones has also been developed. Portable computers, tablets and smart phones may now connect with the mobile core network as well, and participate not only in voice calls but also send and received documents and stream video from various providers. And the access portion of the network is now not owned entirely by a single telephone company for the benefit of its subscribers, but many access networks may be utilized to connect a user with the larger core network and allow them to communicate with others even in distant locations. Once such access network is a WLAN (wireless local area network), to which many wireless device may connect by communicating with a hot spot, or access point using radio communication.

In such an environment, network, access, and UE are made by a variety of different vendors and operated by a variety of subscribers and network operators. A set of standard protocols for operation is therefore needed to allow interoperability. Several organizations promulgate such protocol documents, for example 3GPP, IEEE, ITU, and the IETF. These protocols do not cover all potential situations, however. While many mobile network cores are operated according to 3GPP protocols, for example, non-3GPP networks are increasingly used to access them. Issues related to security may therefore arise.

Note that the techniques or schemes described herein as existing or possible are presented as background for the present invention, but no admission is made thereby that these techniques and schemes were heretofore commercialized or known to others besides the inventors.

SUMMARY OF EMBODIMENTS

The following presents a summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, a method is provided for facilitating WLAN access to a mobile network, the method including initiating a communication session with the device, sending a security challenge to the device, receiving a security-challenge response comprising a device identity attribute, and granting the device access to a mobile core network. The method may be applied, for example, the mobile core network is a 3GPP network and non-3GPP access is being requested. The method may be applied where access being requested is un-trusted WLAN access.

In some embodiments, initiating the communication session may include receiving an authorization request, which may include a device identity attribute. The authorization request may be, for example, IKE_AUTH request according to an IKE protocol, in which case the device identity attribute may include an IKE DEVICE_IDENTITY. The method may further include forwarding the device identity toward a PDN GW or other network component.

In some embodiment, the authorization request may be an EAP-RSP (EAP-response) according to an EAP-AKA or EAP-AKA' protocol, in which case the device identity attribute comprises an EAP-AKA AT_DEVICE_IDENTITY.

In some embodiments, apparatus for facilitating access to a mobile network may include a processor and a non-transitory memory device in communication with the processor. The memory device embodies in a tangible medium at least program instructions that when executed by the processor cause the apparatus to initiate a communication session with a device, send a security challenge to the device, receive a security-challenge response comprising a device identity attribute, and granting the device access to a mobile core network. The program instruction may when executed further cause the apparatus to forward a device identity associated with the device.

Additional aspects of the invention will be set forth, in part, in the detailed description, figures and any claims which follow, and in part will be derived from the detailed description, or can be learned by practice of the invention.

It is to be understood that both the foregoing general description and the following detailed description are exemplary and explanatory only and are not restrictive of the invention as disclosed.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 5 illustrates a device identity parameter according to some embodiments;

FIG. 6 illustrates identity types according to some embodiments;

FIG. 7 illustrates an attribute to allow device identity signaling according to some embodiments;

FIG. 8 illustrates device identity values according to some embodiments;

FIG. 10 illustrates device identity values according to some embodiments.

DETAILED DESCRIPTION

Described herein is a manner of providing information relating to the identity of devices having a need for non-standard access, and in particular non-3GPP WLAN access to a 3GPP mobile core network. There is a growing number of devices having only such access and hence a need to signal device identity for this devices to the network for either authentication or service management.

Figure 1:
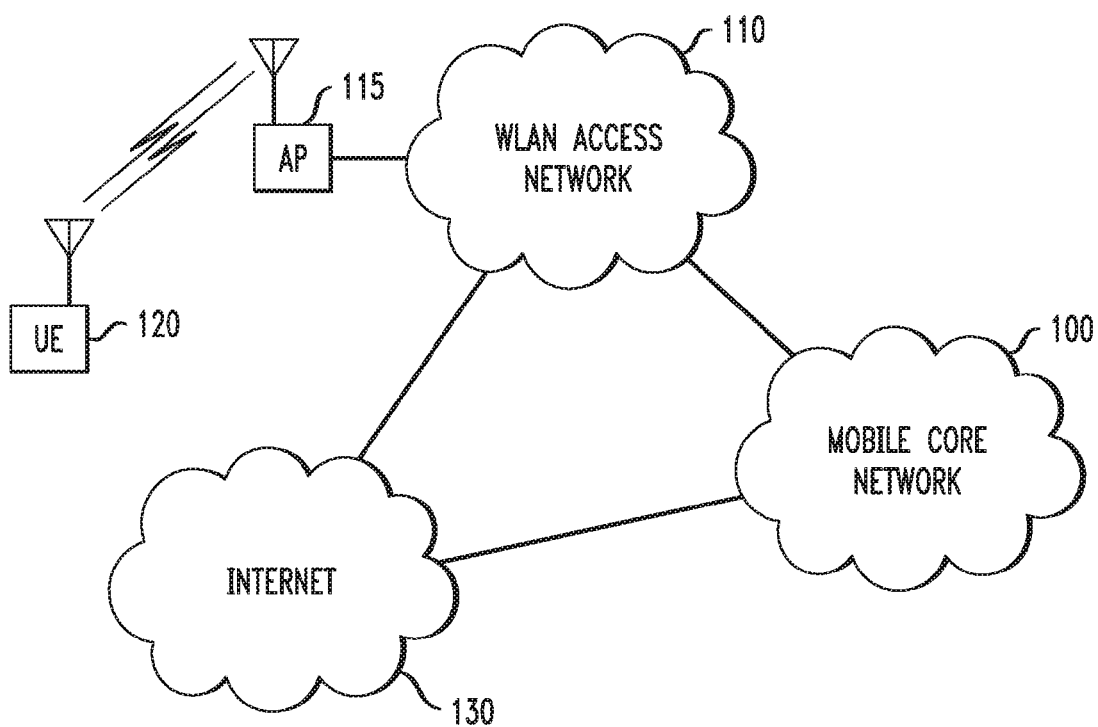
FIG. 1 is a block diagram of a communication system according to some embodiments.

FIG. 1 is a block diagram illustrating a typical access scenario. In FIG. 1, UE 120 establishes a wireless connection with AP (access point) 115 in order to communicate through WLAN access network 110. AP 115 may be considered a part of WLAN access network 110 or is simply a device in communication with it. Note that this access by UE 12 may be to communicate with another UE (not shown) also connected with access network 110, or to communicate with a more distant device through Internet 130 or through mobile core network 100 (which also may provide Internet access). To relate this typical scenario with the solution described herein, it may be presumed that mobile core network 100 is operated according to 3GPP protocols, while WLAN access network 110 is not.

In this scenario, UE may be made by any number of different manufacturers, but all such devices should be identifiable by some unique equipment identifier or software defined identifiers. For example, the identifiers could be the mobile's IMEI (International Mobile Equipment Number) and IMEISV (International Mobile Equipment Number and Software Version) for 3GPP network, MEID (Mobile Equipment Identity) for 3GPP2 network, laptop SN (serial number), medical device UDI (Unique Device Identification), ODIN (Open Device Identification Number), MAC (media access control) address, device serial number (e.g. iPad or iWatch) or any software defined identifiers. In appropriate cases a Bluetooth® address may be also be used.

Some of the devices with unique identifiers will be able to access a mobile core network using 3GPP protocol access but many others, for example a number of household smart devices, may have available only non-3GPP WLAN access. Common protocols used for non-3GPP access, for example IKEv2 and EAP-AKA or EAP-AKA' do not support signaling of the unique identifiers through the network. No solution for this problem has been provided prior to inventors' contribution.

In some embodiments, a manner of signaling identity in the network is proposed by identifying a device parameter and altering currently procedures to allow the identity to promulgate. The device identity parameter may be defined as illustrated in FIG. 5.

In this case the identity type may, for example, be defined as illustrated in FIG. 6.

This parameter may be included in any message when signaling of one or more identity types is needed. In some embodiments, if this or a similar parameter is received with a set Identity Type indicated but an Identity length of zero, it may be viewed as a request to respond with a device identity of the type indicated.

Figure 4:
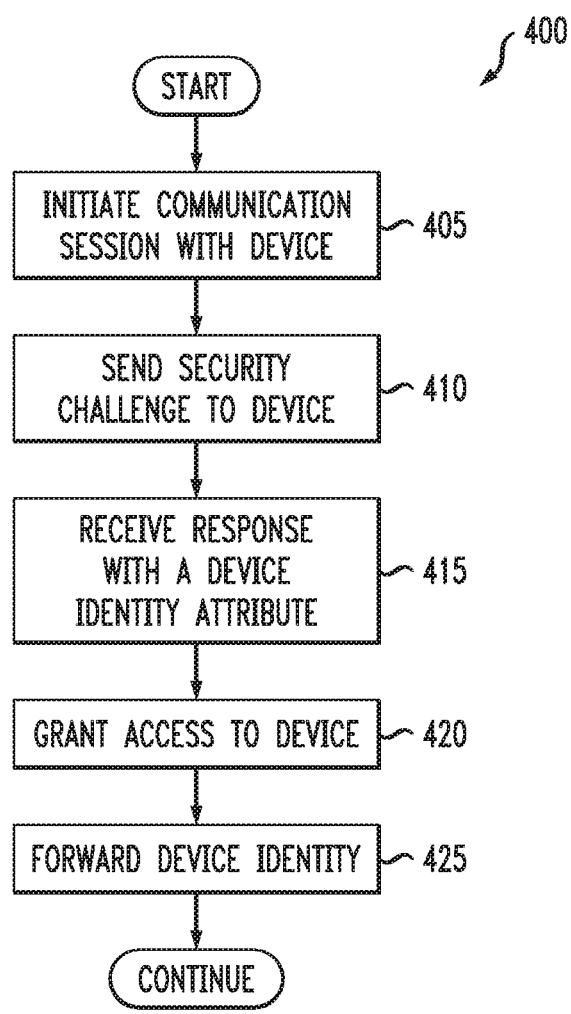
FIG. 4 is a flow diagram illustrating a method according to some embodiments.

FIG. 4 is a flow diagram illustrating a method 400 according to some embodiments. At START it is presumed that the components necessary to performing the operation are available and configured to perform at least this embodiment. The process begins with the initiation of a communication session (step 405) with a device, which may also be referred to as a UE, a term which is intended to be broadly construed. In this step, often initiated by the device itself, a component of an access network such as an access point becomes aware that the device seeks a network connection. The operation, however, may involve more than one message. At some point, however, the network may send a security challenge message (step 410). Presuming the process continues, a response is received (step 415). In addition to any other required information, for example a password, the response in this embodiment includes a device identity attribute, for example in one of the forms identified herein. (In an alternate embodiment (not shown), the device identity attribute is sent in a separate message.)

In the embodiment of FIG. 4, presuming whatever credentials (if any) presented by the device are satisfactory, network access is granted to the device (step 420). The device identity is then forwarded (step 425). Note that this forwarding is a manner of promulgating the device identity to whatever network components mayor should utilize it. Specific examples according to more definite embodiments are provided below. The process then continues with whatever communication and signaling may occur in the communication session.

Note that the sequence of operation illustrated in FIG. 4 represents an exemplary embodiment; some variation is possible within the spirit of the invention. For example, additional operations may be added to those shown in FIG. 4, and in some implementations one or more of the illustrated operations may be omitted. In addition, the operations of the method may be performed in any logically-consistent order unless a definite sequence is recited in a particular embodiment.

In some embodiments, a communication session initiation involves an authentication and security establishment process according to the protocol IKEv2. Here an implementation of the device identity parameter defined above may be embodied in a new attribute DEVICE_IDENTITY to allow a UE to signal device identity, as illustrated in FIG. 7.

In this embodiment, device identity values may be expressed as illustrated in FIG. 8 (these values are of course exemplary and may be varied from one implementation to another).

In some embodiments according to IKEv2, a UE sends an initial IKE_AUTH request message to an ePDG. If the UE subsequently receives an IKE_AUTH response message from the ePDG containing the ePDG certificate, AUTH payload and EAP Payload for AKA-Challenge, the UE verifies the received authentication parameters. Assuming proper verification, the UE sends a new IKE_AUTH request message to the ePDG including the EAP response of AKA-Challenge. If the UE's Mobile Equipment Identity (IMEI) is available, the UE includes the DEVICE_IDENTITY attribute in the CFG_REQUEST Configuration Payload in the new IKE_AUTH request message with the Identity Type field set to either 'IMEI' or 'IMEISV'.

In this embodiment, an ePDG receiving a DEVICE_IDENTITY attribute from a UE and the Identity Type field is either set to 'IMEI' or 'IMEISV', the ePDG forwards the received IMEI or IMEISV identity to the AAA server and to the PDN GW. This process may be described in more detail by reference to a message flow diagram. Note, however, that while the message flow below may be identical to the process described above, it is not necessarily so in all aspects.

Figure 2:
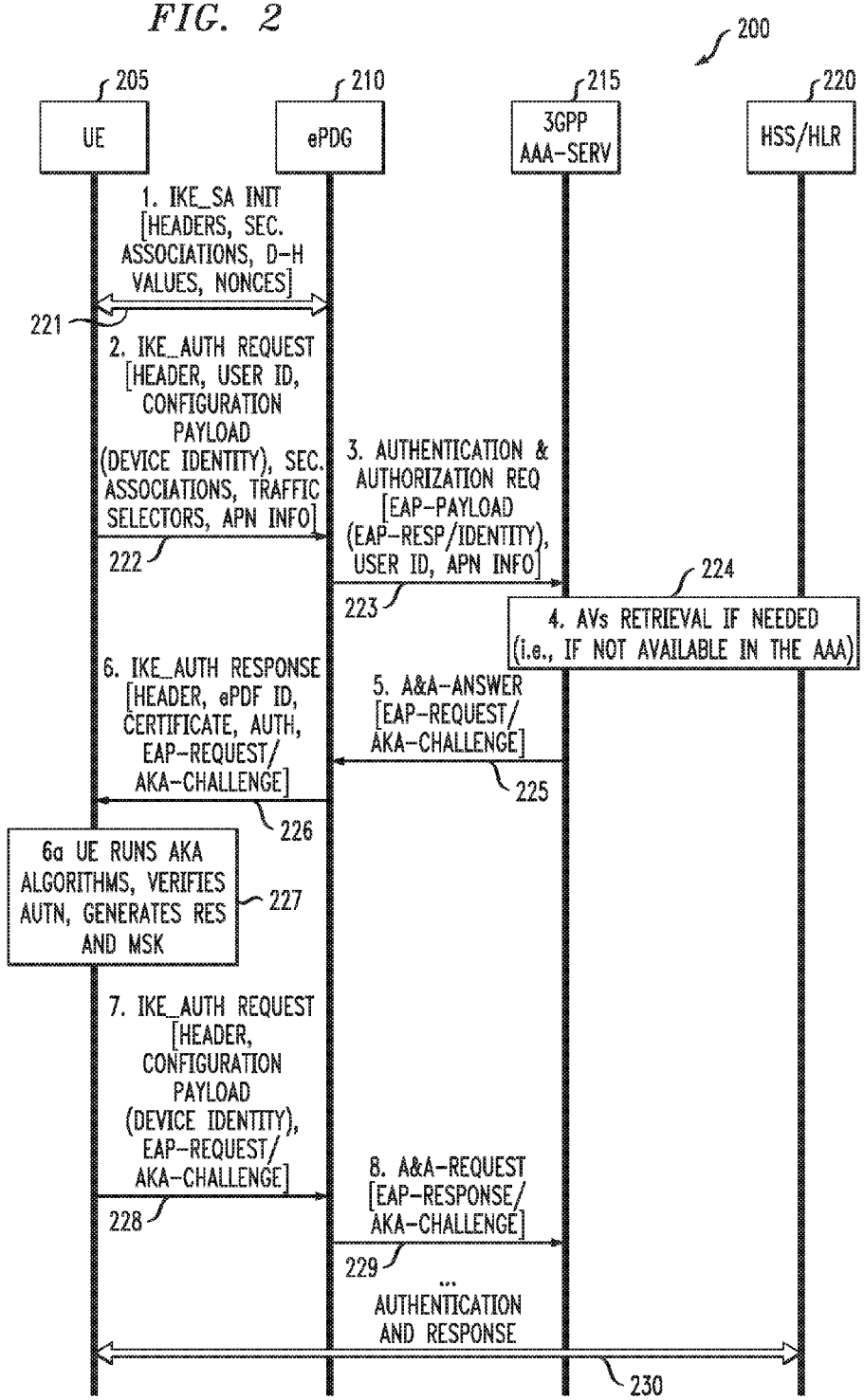
FIG. 2 is a message flow diagram illustrating a session initiation according to some embodiments.

FIG. 2 is a message flow diagram 200 illustrating a session initiation according to some embodiments. This flow generally applies to un-trusted access. In this embodiment, an exemplary message flow according to IKEv2, a number of components are identified and are presumed to be configured for operation at least according to this embodiment. The components illustrated in FIG. 2 are UE 205, ePDG 210, 3GPP AAA server 215, and HSS/HLR 220.

In this embodiment, an IKE SA_INIT message 221 initiates the process and involves the transmission or exchange of a number of attributes. Note that in connection with the message flow diagrams herein, the attributes or values exchanges with individual messages may be but are not necessarily required. And in other embodiments they may vary, be transmitted in more or fewer messages, or not be sent at all. Their illustration in FIGS. 2 and 3 does not imply that other values or attributes are necessarily excluded.

In the embodiment of FIG. 2, the US 205 also sends an IKE_AUTH message 222 to the ePDG 210, which message in this embodiment includes the DEVICE_IDENTTY attribute in the Configuration Payload. The ePDG 210 then transmits an Authentication & Authorization request 223 to the 3GPP AAA server 215. If needed, the 3GPP server 215 retrieves 224 AVs (authentication vectors), for example from the HSS/HLR 220. The 3GPP server 215 then provides an Authentication & Authorization answer 225 to the ePDG 210. The ePDG 210 then sends an IKE_AUTH Response to the US 205.

In the embodiment of FIG. 2, the UE 205 then runs AKA algorithms, verify the AUTN (authentication token), and generates 227 RES and MSK (master session key). the UE then sends IKE_AUTH Request 228 to ePDG 210 which message in this embodiment includes the DEVICE_IDENTTY attribute in the Configuration Payload. In accordance with this embodiment, ePDG 210 then transmits an Authentication & Authorization request to 3GPP AAA server 215.

Figure 9:
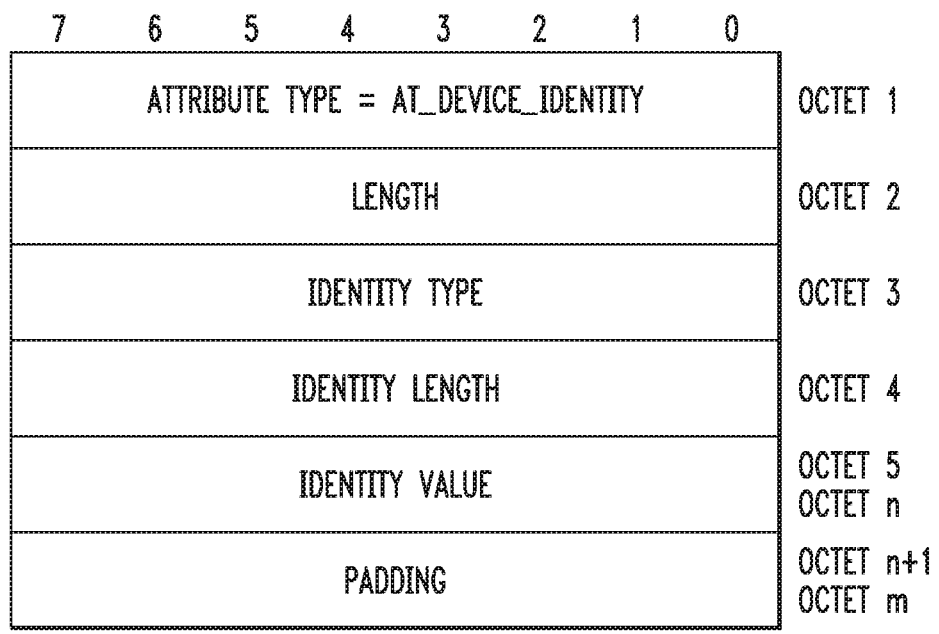
FIG. 9 illustrates a device identity parameter embodied in an attribute to allow device identity signaling according to some embodiments.

In some embodiments, a communication session initiation involves an authentication and security establishment process according to the protocol EAP-AKA or EAP-AKA'. Here an implementation of the device identity parameter defined above may be embodied in a new attribute AT_DEVICE_IDENTITY to allow a UE to signal device identity, as illustrated in FIG. 9.

In this embodiment, device identity values may be expressed as illustrated in FIG. 10 (these values are of course exemplary and may be varied from one implementation to another).

In some embodiments according to EAP-AKA or EAP-AKA', if the UE's Mobile Equipment Identity IMEI or IMEISV is available, the UE includes the IMEI or IMEISV in the AT_DEVICE_IDENTITY attribute in the EAP-Request/AKA-Challenge message when the EAP-AKA is used. When EAP-AKA' is used, the UE includes the IMEI or IMEISV in the AT_DEVICE_IDENTITY attribute in the EAP-Request/AKA'-Challenge message. In either case, the Identity Type field of the AT_DEVICE_IDENTITY attribute may be set to either 'IMEI' or 'IMEISV' as appropriate.

In this embodiment, if the AT_DEVICE_IDENTITY attribute is included and Identity Type field is either set to 'IMEI' or 'IMEISV', then the AAA server forwards the received Mobile Equipment Identity to the TWAN to allow TWAN to forward it further to the PDN GW via the S2a interface. Note that is this embodiment, this is done when either the EAP-Request/AKA-Challenge message or the EAP-Request/AKN-Challenge message (whichever applies) arrives.

Figure 3:
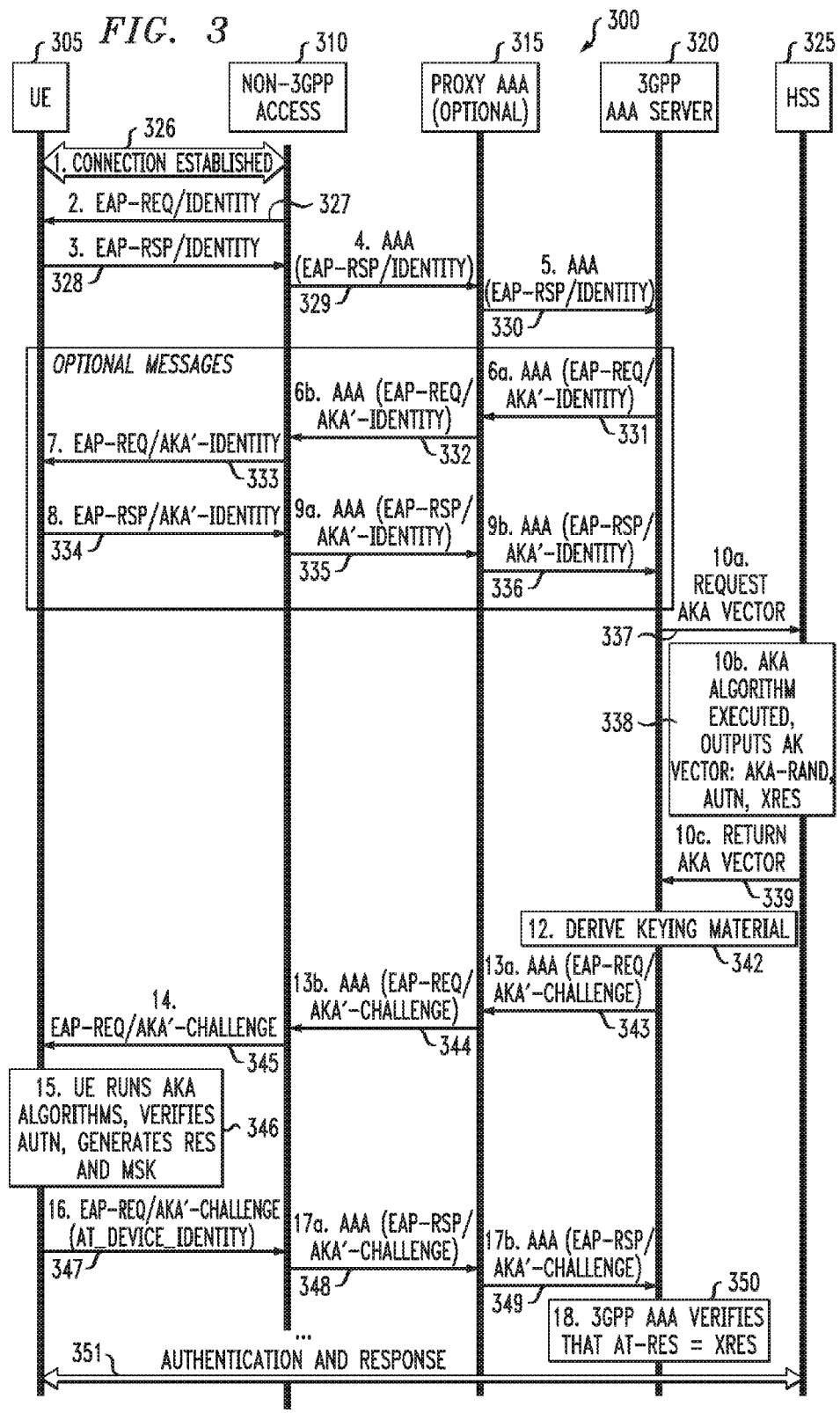
FIG. 3 is a message flow diagram illustrating a session initiation according to some embodiments.

FIG. 3 is a message flow diagram 300 illustrating a session initiation according to some embodiments. This flow generally applies to trusted access. In this embodiment, an exemplary message flow according to EAP-AKA or EAP-AKA', a number of components are identified and are presumed to be configured for operation at least according to this embodiment. The components illustrated in FIG. 3 are UE 305, non-3GPP access 310 (network or node), an optional Proxy AAA 315, a 3GPP AAA server 320 and HSS 325.

In this embodiment, the authentication and response process is initiated then a connection is established 326 between the UE 305 and the non-3GPP access 310. The UE 305 then receives an EAP-REQ/Identity 327 and returns an EAP-RSP/Identity 328. The non-3GPP access 310 then sends an AAA message 329 including the EAP-RSP/Identity to the Proxy AAA 315, which in turn sends a message 330 to the 3GPP AAA server 320.

Optionally, is applicable implementations the 3GPP AAA server 315 sends an AAA (EAP-REQ/AKA'-Identity message 333 to UE 305 via Proxy AAA 315 (message 331) and non-3GPP access 310 (message 332). In this embodiment, the UE 305 returns an AAA (EAP-RSP/AKA'-Identity message 336 to the 3GPP AAA server 320 by the same route (messages 334 and 335). Regardless of whether these optional messages are sent and received, the 3GPP AAA server 320 then sends a Request AKA vector 337 to the HSS 325. The HSS 325 responds with Return AKA vector 339.

In the embodiment of FIG. 2, the 3GPP AA server 325 then derives 342 keying material and sends an AAA (EAP-REQ/AKA'-Challenge message 345 to the UE 305 via the Proxy AAA (message 343) and non-3GPP access 310 (message 344). In the embodiment of FIG. 3, the UE 205 then runs AKA algorithms, verify the AUTN (authentication token), and generates 346 RES (response) and MSK (MBMS (multimedia broadcast/multimedia service) service key).

In this embodiment, the UE 305 then responds with an EAP-RSP/AKA'-Challenge message 347 including the AT_DEVICE_IDENTITY attribute to non-3GPP access 310, which in turn sends an AAA EAP-RSP/AKA'-Challenge message 349 to 3GPP AAA server 320 via Proxy AAA 315 (message 348). The 3GPP AAA server 320 then verifies 350 that the AT-RES=XRES (expected response).

Note that the sequences of message flow illustrated in FIGS. 2 and 3 represent exemplary embodiments; some variation is possible within the spirit of the invention. For example, additional messaging may be added to that shown in FIGS. 2 and 3, and in some implementations one or more of the illustrated messages may be omitted. In addition, the messages of the method may be transmitted and received in any logically-consistent order unless a definite sequence is recited in a particular embodiment.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the sequence in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method of facilitating non-3GPP™ (THIRD GENERATION PARTNERSHIP PROJECT) service provision for a device connecting to a 3GPP™ mobile network via an un-trusted WLAN (wireless local area network), comprising:
    initiating a communication session with the device;
    receiving at an ePDG (evolved packet data gateway) an IKE_AUTH Request according to an IKE (internet key exchange) protocol comprising an IKE DEVICE_IDENTITY attribute and a user ID (identification);
    sending an IKE_AUTH Response comprising a security challenge including an identity type but not an identity value to the device;
    receiving at the ePDG a security-challenge response comprising the IKE DEVICE_IDENTITY attribute, the IKE DEVICE_IDENTITY attribute of the security-challenge response comprising the identity type, an identity length, and an identity value;
    forwarding the IKE DEVICE identity to an authentication server;
    granting network access to the device; and
    forwarding the device identity.

2. The method of claim 1, wherein the IKE DEVICE_IDENTITY attribute of the security-challenge response includes an identity value corresponding to at least one of an IMEI (international mobile equipment identity) or an IMEISV (IMEI and software version).

3. The method of claim 2, further comprising forwarding a mobile equipment identity associated with the at least one of an IMEI or an IMEISV toward a PDN GW (packet data network gateway).

4. The method of claim 3, wherein the mobile equipment identity is forwarded toward the PDN GW via a TWAN (trusted wireless local area network).

5. The method of claim 1, wherein the IKE_AUTH Response comprising a security challenge includes an identity length of zero.

6. A method of facilitating non-3GPP™ (THIRD GENERATION PARTNERSHIP PROJECT) service provision for a device connecting to a 3GPP™ mobile network via an un-trusted WLAN, comprising:
    initiating a communication session with the WLAN (wireless local area network);
    sending from the device via the WLAN an IKE_AUTH Request according to an IKE protocol, the IKE_AUTH Request comprising an IKE DEVICE_IDENTITY attribute and a user ID;
    receiving at the device an IKE_AUTH Response comprising a security challenge including an identity type but not an identity value via the WLAN; and sending toward an ePDG (evolved packet data gateway) via the WLAN a security-challenge response comprising an IKE DEVICE_IDENTITY attribute, the IKE DEVICE_IDENTITY attribute of the security-challenge response comprising the identity type, an identity length, and an identity value;

receiving authorization to access the 3GPP™ mobile network; and communicating via the 3GPP™ mobile network using the identity value.

7. The method of claim 6, wherein the IKE_AUTH Response comprising a security challenge includes an identity length of zero.

8. The method of claim 6, wherein the IKE DEVICE_IDENTITY attribute of the security-challenge response includes an identity value corresponding to at least one of an IMEI (international mobile equipment identity) or an IMEISV (IMEI and software version).

* * * * *